United States Patent
Kilian et al.

(10) Patent No.: US 10,125,838 B2
(45) Date of Patent: Nov. 13, 2018

(54) PARTICLE VIBRATION DAMPER ASSEMBLY FOR A VEHICLE

(71) Applicant: Ford Global Technologies, LLC, Dearborn, MI (US)

(72) Inventors: Erik Kilian, Northville, MI (US); Kevin Zenkai Chow, Northville, MI (US); Louis Delellis, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/377,053

(22) Filed: Dec. 13, 2016

(65) Prior Publication Data
US 2018/0163809 A1 Jun. 14, 2018

(51) Int. Cl.
*F16F 7/10* (2006.01)

(52) U.S. Cl.
CPC ........ *F16F 7/10* (2013.01); *F16F 2224/0208* (2013.01)

(58) Field of Classification Search
CPC ...... F16F 7/01; F16F 7/015; F16F 7/10; F16F 7/1005; F16F 7/1022; F16F 7/1028
See application file for complete search history.

(56) References Cited

U.S. PATENT DOCUMENTS

| | | | | |
|---|---|---|---|---|
| 2,417,347 A * | 3/1947 | Brown | ...................... | F16F 7/01 188/268 |
| 6,435,470 B1 * | 8/2002 | Lahham | .................... | F16F 7/10 248/632 |
| 7,354,637 B2 | 4/2008 | Tagawa et al. | | |
| 8,991,574 B2 * | 3/2015 | Provost | .................... | F16F 7/116 188/268 |
| 2004/0007858 A1 * | 1/2004 | Simonian | ............... | B62D 7/222 280/731 |
| 2010/0320046 A1 * | 12/2010 | Provost | .................... | F16F 7/015 188/380 |
| 2014/0093048 A1 | 4/2014 | Kropp et al. | | |

FOREIGN PATENT DOCUMENTS

GB 1293391 * 8/2002

* cited by examiner

*Primary Examiner* — Vishal R Sahni
(74) *Attorney, Agent, or Firm* — Jason C. Rogers; Brooks Kushman P.C.

(57) ABSTRACT

A vehicle vibration damper assembly may include a bracket, a canister, and steel shot. The bracket is for mounting to an engine compartment rail in mechanical contact with an engine. The canister is mounted to the bracket and defines a cavity. The steel shot is disposed within the canister in an amount selected to reduce an amplitude of a vibration of the engine during operation. The bracket may be mounted to an engine compartment rail. The bracket may be secured proximate an engine compartment rail such that the canister is mechanically connected to the engine. The amount of the steel shot may be such that energy generated by the engine during operation is dissipated into heat energy or impact energy by the steel shot.

16 Claims, 4 Drawing Sheets

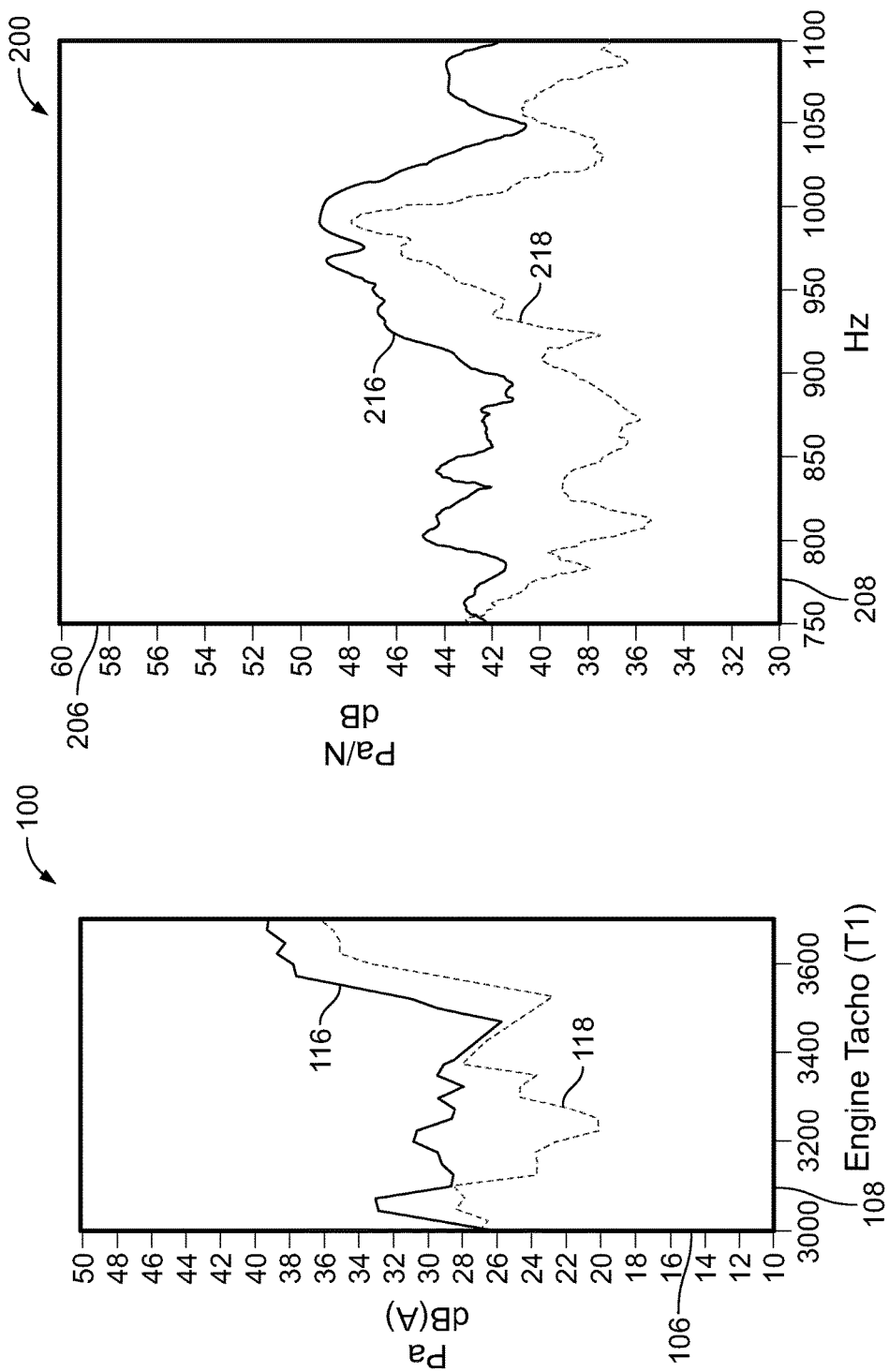

PARTICLE VIBRATION DAMPER ASSEMBLY FOR A VEHICLE

TECHNICAL FIELD

This disclosure relates to damper assemblies for automotive vehicles.

BACKGROUND

Vehicle components, such as an engine, produce vibrations during operation. For example, a vehicle component may have moving components which produce the vibrations. These vibrations may be received or detected by a passenger in a vehicle cabin.

SUMMARY

A vehicle vibration damper assembly includes a receptacle mounted to a vehicle body structure in a location proximate a vibration emitting component. The receptacle defines a cavity sized to receive steel shot. An amount of the steel shot is selected to reduce amplitudes of operation vibration of the vibration emitting component. The vibration emitting component may be one of an engine, an engine component, or a suspension system component. The amount of the steel shot may be between 2.6 pounds and 2.7 pounds. The receptacle may include a first member, a second member, and a seal disposed therebetween to hermetically seal the cavity. A bracket may support the receptacle and may be secured to an engine compartment rail. The assembly may include a plug sized to seal an access port defined by the receptacle for receiving the steel shot. The receptacle may be mounted proximate the vibration emitting component such that energy created by the vibration emitting component during operation is dissipated into friction heat energy or impact energy by the steel shot.

A vehicle vibration damper assembly includes a bracket, a canister, and steel shot. The bracket is for mounting to an engine compartment rail in mechanical contact with an engine. The canister is mounted to the bracket and defines a cavity. The steel shot is disposed within the canister in an amount selected to reduce an amplitude of a vibration from the engine during operation. The bracket may be mounted to an engine compartment rail. The bracket may be secured proximate an engine compartment rail such that the canister is mechanically connected to the engine. The amount of the steel shot may be such that energy generated by the engine during operation is dissipated into heat energy or impact energy by the steel shot. The amount of the steel shot may be between 2.6 pounds and 2.7 pounds. The bracket may be located within an engine compartment for direct contact with an engine mount. An amount of the steel shot may be selected to fill substantially ninety percent of a volume of the canister.

A vehicle vibration damper assembly includes a bracket, a first member, a second member, a seal, and loose shot. The first member is secured to the bracket. The second member includes a body extending from a base portion. The seal is disposed between the first and second members. The loose shot is disposed within a cavity defined by the first and second members when secured to one another. The bracket is mounted to an engine compartment rail such that the cavity is located adjacent a vibration emitting component. The loose shot may be one of steel shot, lead shot, and glass beads. The vibration emitting component may be one of an engine, an engine component, and a suspension system component. An amount of shot selected may fill substantially ninety percent of a volume of the cavity. The body may define a port for receiving the shot within the cavity. An amount of the loose shot may be selected to reduce an amplitude of a vibration of a vibration emitting component located adjacent the assembly.

BRIEF DESCRIPTION OF THE DRAWINGS

FIG. 5 is a chart illustrating an example of a sound pressure received by a driver's ear due to operation of a vehicle vibration emitting component.

FIG. 6 is a chart illustrating an example of a sound pressure sensitivity received in a front vehicle seat due to operation of a vehicle vibration emitting component.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ embodiments of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Components of automotive vehicles may output vibrations or noise during operation. For example, vehicle combustion engines may produce 19th engine order broad band frequency vibrations generated from mechanical components in the engine. These frequencies may pass through the air or via vehicle components and into the passenger compartment of the vehicle resulting in an undesired sound pressure on a driver or a passenger's ear. Further, since the engine is attached to a vehicle body structure, these vibrations may excite structural systems of the vehicle body structure. This energy excitement may generate structure borne noise which results in sound pressure or noise in the passenger compartment creating additional customer concerns.

Figure 1:
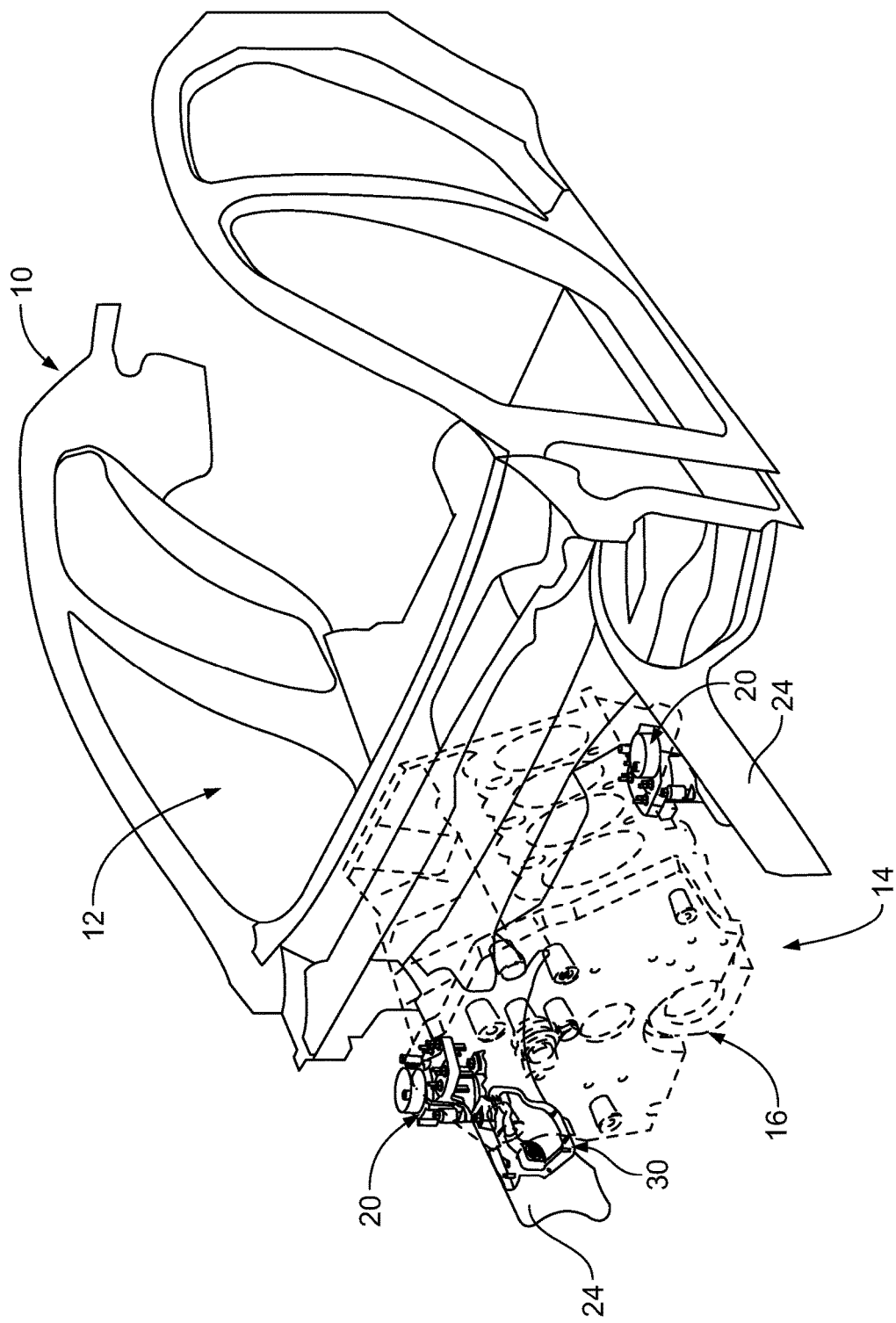
FIG. 1 is a perspective view of a portion of a vehicle body.

FIG. 1 shows an example of a portion of a vehicle body, referred to generally as a vehicle body 10 herein. The vehicle body 10 includes a cabin portion 12 and an engine compartment portion 14. An engine 16 is housed within the engine compartment portion 14. For example, one or more engine mounts 20 may secure the engine 16 to one or more engine compartment rails 24. A damper assembly 30 may be secured to one of the engine compartment rails 24 to assist in mitigating vibrations of components within the engine compartment. For example, the damper assembly 30 may assist in absorbing vibration energy transferred to a vehicle body structure from a vibration emitting source and/or assist in transferring structural response vibration from the vibration emitting source. Examples of vibration emitting sources include the engine 16, moving components of the engine 16, and a vehicle suspension system. Examples of the moving components of the engine 16 include a timing chain, gears, valves, bearings, and an air induction system.

Figure 2:
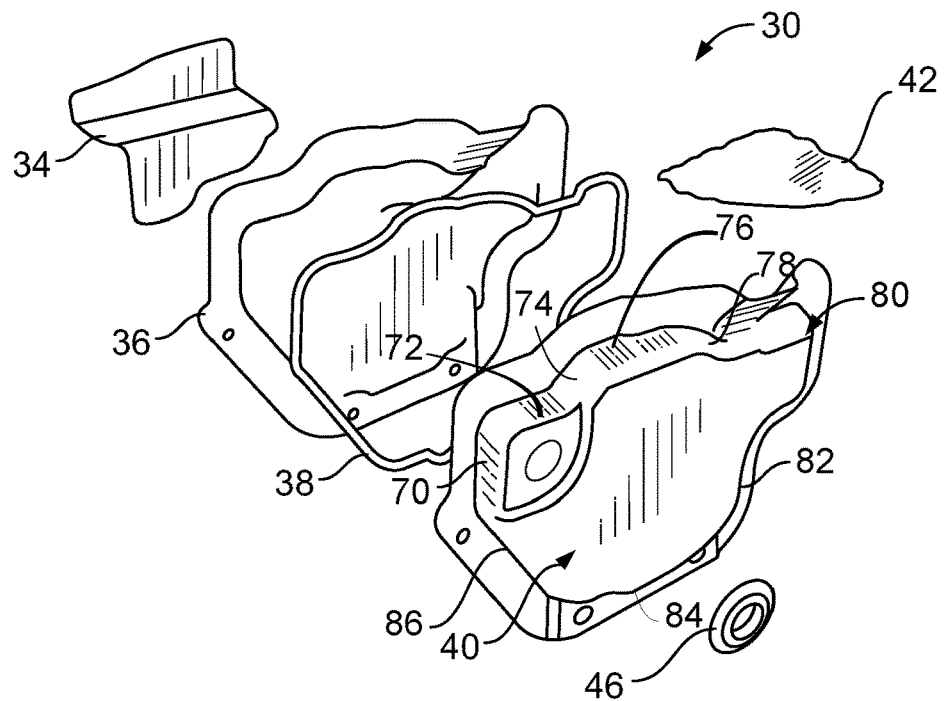
FIG. 2 is an exploded perspective view of an example of a damper assembly for a vehicle.
Figure 3:
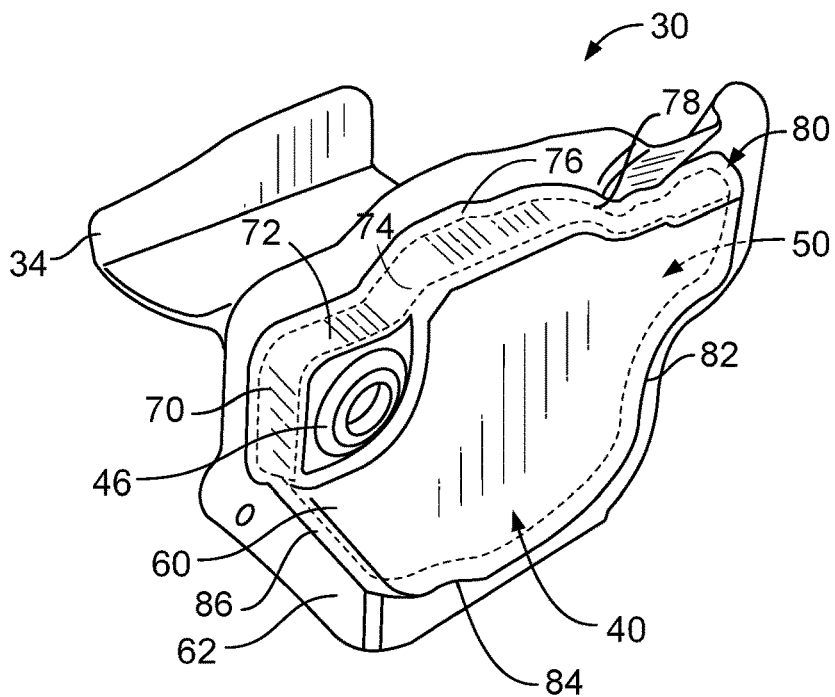
FIG. 3 is a perspective view of the example of the damper assembly of FIG. 2 shown assembled.

FIGS. 2 and 3 show the damper assembly 30. The damper assembly 30 includes a bracket 34, a first member 36, a seal 38, a second member 40, shot 42, and a plug 46. The damper assembly 30 may be mounted to the vehicle body 10 at a location adjacent or proximate the vibration emitting source. In one example, the bracket 34 is secured to one of the engine compartment rails 24 proximate the engine mount 20 and supports the first member 36. In this example, the damper assembly 30 is mechanically connected to the engine 16 by the engine compartment rail 24 and the engine mount 20.

The seal 38 is sized for disposal between the first member 36 and the second member 40. For example, the seal 38 may hermetically seal a cavity 50 defined by the first member 36 and the second member 40. The cavity 50 may be sized to receive the shot 42. In one example, the cavity 50 is sized such that substantially ninety percent of a volume of the cavity 50 is filled. The second member 40 may include a body 60 extending from a base portion 62 to further define the cavity 50. A size and shape of the body 60 may be selected based on packaging space available within an engine compartment, such as the engine compartment 14. A size and shape of the body 60 may also be selected based on an amount of mass of the shot 42 for disposal therein.

The amount of mass and a type of the shot 42 may be selected to optimally reduce an amplitude of a vibration of the vibration emitting source during operation. A vibration of the engine 16 may be such that a passenger in the cabin portion 12 may detect the vibrations during vehicle operation. The shot 42 may be steel shot selected to reduce the amplitude of the vibration of the components of the engine 16. In this example, a mass of the steel shot may be between 2.6 pounds and 2.7 pounds. Other examples of the type of the shot 42 include lead shot, sand, and glass beads.

The type of the shot 42 may also be based on a material suitable to assist in absorbing energy generated by the vibrations of the vibration emitting component. For example, the shot 42 may assist in absorbing energy from a vehicle body structural response generated from the vibrations of the vibration emitting component. The shot 42 may dissipate the energy received into friction heat energy or impact energy. This energy transformation attenuates the frequency wave amplitudes to reduce energy associated therewith and reduces amplitudes of excitation vibrations to levels such that the vehicle body is less excited.

The second member 40 may include a collection of sides to define a shape. A first vertical side 70 is located adjacent the plug 46 and oriented substantially parallel with a vertical axis defined by the engine mount 20. A first horizontal side 72 extends along an axis substantially ninety degrees from the first vertical side 70 in a longitudinal vehicle direction. A first angle side 74 extends upward from the first horizontal side 72 at an angle to a second horizontal side 76. A second angle side 78 extends downward at an angle from the second horizontal side 76 to a canister outcrop 80. The canister outcrop 80 includes a portion curving toward a center of the second member 40. A second vertical side 82 extends from the canister outcrop and is oriented substantially parallel to the vertical axis defined by the engine mount 20. A third horizontal side 84 extends from the second vertical side 82 to a third angle side 84. The third angle side 84 extends between the third horizontal side 84 to the first vertical side 70.

Figure 4:
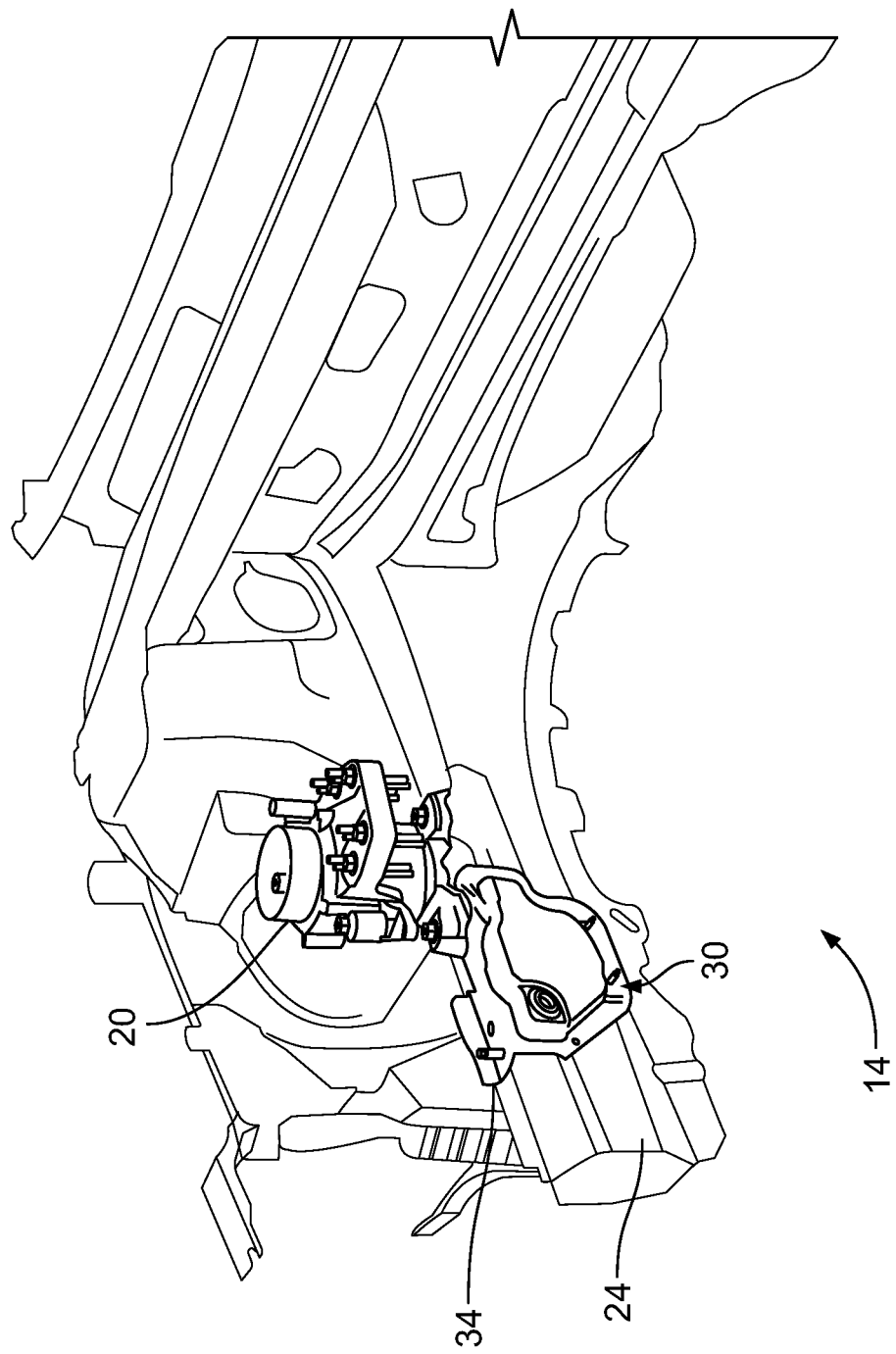
FIG. 4 is a perspective view of the example of the damper assembly of FIG. 2 shown mounted to an engine compartment rail.

FIG. 4 shows an example of a mount location for the damper assembly 30. In this example, the damper assembly 30 is shown mounted to the engine compartment rail 24 at a location proximate one of the engine mounts 20 and in which the damper assembly 30 is mechanically connected to the engine 16. For example, the engine 16 is mechanically connected to the engine mount 20. The engine mount 20 is mechanically connected to the engine compartment rail 24. The damper assembly 30 is mechanically connected to the engine compartment rail 24. Components of the vehicle body 10 are arranged with the engine compartment rail 24 such that a passenger located with the cabin portion 12 may be subject to receiving noise and/or vibrations of the engine 16 during operation.

FIG. 5 is a chart 100 showing an example of test results relating to sound pressure and noise received by a passenger's ear in a vehicle cabin due to a vibration emitting component. A Y-axis 106 represents a decibel level. A X-axis 108 represents an engine rpm value. Plot 116 and plot 118 represent a comparison of a sound level received in a vehicle cabin in which a damper assembly is and isn't included within an engine compartment. Plot 116 represents a sound pressure received by a driver or passenger's ear in a vehicle without a damper assembly, such as the damper assembly 30. Plot 118 represents a sound pressure received by a driver or passenger's ear in a vehicle with a damper assembly mounted within an engine compartment, such as the damper assembly 30. Referring to rpms 3050 through 3700, the chart 100 shows a 2-5 decibel improvement when a damper assembly is mounted within an engine compartment (plot 118), such as inclusion of the damper assembly 30, in comparison to an absence of the damper assembly within an engine compartment (plot 116).

FIG. 6 is a chart 200 showing an example of test results relating to sound pressure and noise received by a passenger in a vehicle front seat due to a vibration emitting component. A Y-axis 206 represents a decibel level. A X-axis 208 represents a frequency value. Plot 216 and plot 218 represent a comparison of vehicle cabin sound sensitivity to a vibrational force received by an engine compartment rail. Plot 216 represents an example in which the vehicle does not include a damper assembly mounted to an engine compartment rail. Plot 218 represents an example in which the vehicle includes a damper assembly mounted to an engine compartment rail. Referring to frequency range 755 Hz through 1100 Hz, the chart 200 shows a 1-9 decibel sensitivity improvement of when a damper assembly is mounted within an engine compartment (plot 218), such as inclusion of the damper assembly 30, in comparison to an absence of the damper assembly within an engine compartment (plot 216). Inclusion of a damper assembly drives less sensitivity to a given engine excitation.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to marketability, appearance, consistency, robustness, customer acceptability, reliability, accuracy, etc. As such, embodiments described as less desirable than other embodiments or prior art implementations with respect to one or more characteristics are not outside the scope of the disclosure and can be desirable for particular applications.

What is claimed is:

1. A vehicle vibration damper assembly comprising:
a receptacle mounted to a vehicle body structure, located proximate and mechanically connected to an engine, and including a first component, a second component defining a cavity to receive steel shot, and a seal therebetween,
wherein the second component includes a plug for cavity access without removal of the engine and located at a second component periphery, and wherein the second component further includes a first vertical side located adjacent the plug, a first horizontal side extending ninety degrees from the first vertical side in a longitudinal vehicle direction, a first angle side extending upward from the first horizontal side to a second horizontal side, a second angle side extending downward from the second horizontal side to a canister outcrop having a curve toward a canister center, a second vertical side extending from the canister outcrop, a third horizontal side extending from the second vertical side, and a third angle side extending from the third horizontal side to the first vertical side.

2. The assembly of claim 1, wherein an amount of the steel shot is between 2.6 pounds and 2.7 pounds.

3. The assembly of claim 1, wherein the seal hermetically seals the cavity.

4. The assembly of claim 1 further comprising a bracket supporting the receptacle and secured to an engine compartment rail, wherein the second component is shaped for disposal between the engine compartment rail and the engine.

5. The assembly of claim 1, wherein the plug is sized to seal an access port defined by the receptacle for receiving the steel shot, and wherein the plug is accessible when the engine is mounted to the vehicle body structure.

6. The assembly of claim 1, wherein the receptacle is mounted proximate to the engine such that energy created by the engine during operation is dissipated into friction heat energy or impact energy by the steel shot.

7. A vehicle engine compartment assembly comprising:
an engine compartment rail;
an engine mount defining a vertical mount axis and secured to the engine compartment rail;
an engine secured to the engine mount to define a damper cavity between the engine and the engine compartment rail;
a bracket for mounting to the engine compartment rail an in mechanical communication with the engine;
a canister mounted to the bracket and disposed within the damper cavity, defining a cannister cavity, and including a plug located at a canister periphery for access without removal of the engine; and
steel shot disposed within the canister in an amount selected to reduce an amplitude of a vibration level of the engine,
wherein the canister includes a first vertical side located adjacent the plug and oriented substantially parallel to the vertical mount axis, a first horizontal side extending ninety degrees from the first vertical side in a longitudinal vehicle direction, a first angle side extending upward from the first horizontal side to a second horizontal side, a second angle side extending downward from the second horizontal side to a canister outcrop having a curve toward a canister center, a second vertical side extending from the canister outcrop and oriented substantially parallel to the vertical mount axis, a third horizontal side extending from the second vertical side, and a third angle side extending from the third horizontal side to the first vertical side.

8. The assembly of claim 7, wherein the bracket is secured to the engine compartment rail such that the canister is in mechanical communication with the engine.

9. The assembly of claim 7, wherein the amount of the steel shot is selected such that energy generated by the engine during operation is dissipated into heat energy or impact energy by the steel shot.

10. The assembly of claim 7, wherein the amount of the steel shot is between 2.6 pounds and 2.7 pounds.

11. The assembly of claim 7, wherein the amount of the steel shot is selected to fill substantially ninety percent of a volume of the canister.

12. A vehicle engine compartment assembly comprising:
an engine compartment rail;
an engine mount mounted to the engine compartment rail and defining a vertical mount axis;
an engine mounted to the engine mount such that a damper cavity is defined between the engine and the engine compartment rail;
a bracket mounted to the engine compartment rail;
a first member secured to the bracket;
a second member secured to the first member and including a body shaped for disposal within the damper cavity and a plug located at a second member periphery for access without removal of the engine;
a seal disposed between the first member and the body; and
loose shot disposed within a cavity defined by the first and second members when secured to one another,
wherein the bracket is mounted to an engine compartment rail such that the second member is in mechanical communication with the engine, and wherein the body includes a first vertical side located adjacent the plug and oriented substantially parallel to the vertical mount axis, a first horizontal side extending ninety degrees from the first vertical side in a longitudinal vehicle direction, a first angle side extending upward from the first horizontal side to a second horizontal side, a second angle side extending downward from the second horizontal side to a canister outcrop having a curve toward a canister center, a second vertical side extending from the canister outcrop and oriented substantially parallel to the vertical mount axis, a third horizontal side extending from the second vertical side, and a third angle side extending from the third horizontal side to the first vertical side.

13. The assembly of claim 12, wherein the loose shot is one of steel shot, lead shot, and glass beads.

14. The assembly of claim 12, wherein an amount of the loose shot is selected to fill substantially ninety percent of a volume of the cavity.

15. The assembly of claim 12, wherein the body defines a port for receiving the loose shot and the plug.

16. The assembly of claim 12, wherein an amount of the loose shot is selected to reduce an amplitude of a vibration of the engine via the mechanical communication between the second member and the engine.

* * * * *